United States Patent
Brouwer et al.

(10) Patent No.: US 9,932,677 B2
(45) Date of Patent: Apr. 3, 2018

(54) METHOD FOR CORROSION-PROTECTIVE SERIAL SURFACE TREATMENT OF METALLIC COMPONENTS

(71) Applicant: Henkel AG & Co. KGaA, Duesseldorf (DE)

(72) Inventors: Jan-Willem Brouwer, Willich (DE); Frank-Oliver Pilarek, Cologne (DE); Kirsten Agnes Lill, Duesseldorf (DE); Fernando Jose Resano Artalejo, Duesseldorf (DE); Natascha Henze, Leverkusen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 305 days.

(21) Appl. No.: 14/636,457

(22) Filed: Mar. 3, 2015

(65) Prior Publication Data

US 2015/0176138 A1 Jun. 25, 2015

Related U.S. Application Data

(63) Continuation of application No. PCT/EP2013/067542, filed on Aug. 23, 2013.

(30) Foreign Application Priority Data

Sep. 4, 2012 (DE) ........................ 10 2012 215 679

(51) Int. Cl.

| | |
|---|---|
| *C23C 22/60* | (2006.01) |
| *C23C 22/53* | (2006.01) |
| *C23C 22/78* | (2006.01) |
| *C23C 22/34* | (2006.01) |
| *C23C 22/66* | (2006.01) |
| *C23C 22/73* | (2006.01) |
| *C23C 22/77* | (2006.01) |
| *C23C 22/83* | (2006.01) |
| *C23C 22/86* | (2006.01) |
| *C23G 1/22* | (2006.01) |
| *C23G 1/36* | (2006.01) |
| *G05D 21/02* | (2006.01) |
| *C23C 22/07* | (2006.01) |
| *C23C 22/00* | (2006.01) |

(52) U.S. Cl.
CPC .............. *C23C 22/78* (2013.01); *C23C 22/07* (2013.01); *C23C 22/34* (2013.01); *C23C 22/60* (2013.01); *C23C 22/66* (2013.01); *C23C 22/73* (2013.01); *C23C 22/77* (2013.01); *C23C 22/83* (2013.01); *C23C 22/86* (2013.01); *C23G 1/22* (2013.01); *C23G 1/36* (2013.01); *G05D 21/02* (2013.01)

(58) Field of Classification Search
CPC ......... C23C 22/53; C23C 22/60–22/67; C23G 1/14; C23G 1/16
See application file for complete search history.

(56) References Cited

U.S. PATENT DOCUMENTS

2013/0202800 A1* 8/2013 Brouwer ................. C23C 22/34
427/327

FOREIGN PATENT DOCUMENTS

| | | |
|---|---|---|
| DE | 10010758 A1 | 9/2001 |
| DE | 102010001686 A1 | 8/2011 |
| EP | 0434358 A2 | 6/1991 |
| EP | 1051672 B1 | 4/2002 |
| EP | 1550740 A1 | 7/2005 |
| WO | 9907917 A1 | 2/1999 |
| WO | 0009780 A1 | 2/2000 |
| WO | WO 2011/098322 * 8/2011 ............. C23C 22/60 |

OTHER PUBLICATIONS

International Search Report for PCT/EP2013/067542, dated Dec. 12, 2013, 3 pages.

* cited by examiner

*Primary Examiner* — Lois L Zheng
(74) *Attorney, Agent, or Firm* — Mary K. Cameron

(57) ABSTRACT

The present invention relates to a method for serial surface treatment of metallic components comprising aluminum surfaces, wherein an alkaline pretreatment is followed by a conversion treatment. According to the invention, the intention during the alkaline pretreatment is that a maximum value for the concentration of dissolved zinc is not exceeded, in order to ensure a sufficient quality of the corrosion-protective coating on the aluminum surface of the components following the surface treatment. In a preferred embodiment, the content of dissolved zinc is effectively held below the respective bath-typical maximum value of dissolved zinc by the addition of compounds constituting a source of sulfide ions. The functionality of the surface treatment can be additionally increased by likewise controlling the content of dissolved aluminum in the alkaline pretreatment such that, by adding compounds constituting a source for silicate anions, a threshold value for dissolved aluminum is not exceeded.

13 Claims, No Drawings

METHOD FOR CORROSION-PROTECTIVE SERIAL SURFACE TREATMENT OF METALLIC COMPONENTS

The present invention relates to a method for the serial surface treatment of metallic components comprising aluminum surfaces, in which method an alkaline pretreatment is followed by a conversion treatment. According to the invention, the intention during the alkaline pretreatment is that a maximum value for the concentration of dissolved zinc is not exceeded, in order to ensure sufficient quality of the corrosion-protective coating on the aluminum surfaces of the components after the surface treatment is carried out. In one preferred method, the content of dissolved zinc is effectively held below the respective maximum value of dissolved zinc, typical of the bath, by the metered addition of compounds which represent a source of sulfide ions. In addition, the functionality of the surface treatment may be increased by likewise controlling the portion of dissolved aluminum in the alkaline pretreatment such that, by the metered addition of compounds which represent a source of silicate anions, a threshold value for dissolved aluminum is not exceeded.

The cleaning and surface conditioning of metal parts prior to their further processing represents a standard task in the metalworking industry. The metal parts may be soiled with pigment contamination, dust, metal debris, corrosion protection oils, cooling lubricants, or forming aids, for example. Prior to further processing, in particular prior to corrosion protection treatment (for example, phosphating, chromating, reaction with complex fluorides, etc.), these impurities must be removed using a suitable cleaner solution. The cleaning should moreover fulfill the task of preconditioning the metal surfaces for the subsequent corrosion protection treatment. The preconditioning is a type of activation of the metal surfaces, which, in particular in a subsequent wet chemical conversion treatment, results in homogeneous inorganic corrosion-protective coatings having a sufficient layer thickness. Such preconditioning or activation is initiated by a pickling process, and may moreover include occupation of the metal surfaces with metallic foreign elements. An example of preconditioning known in the prior art, which, when followed by a conversion treatment, results in an improvement in the corrosion protection properties, is the alkaline steeling of galvanized steel, which is described in detail in DE 102010001686.

As a wet chemical pretreatment prior to a conversion treatment, the industrial cleaners or activation baths, such as the above-mentioned steeling, are generally rendered alkaline, and have pH values in the range above 7, for example 9 to 12. Their basic components are alkalis and nonionic and/or anionic surfactants. The cleaners frequently contain complexing agents as additional auxiliary components.

The alkalis in these baths contribute to the cleaning power thereof, for example, by saponifying impurities such as fats and making them water-soluble, or contribute to the surface activation by pickling the metallic surfaces. As the result of such reactions, optionally also by drag-out, alkalinity is depleted, so that the cleaning action during a serial surface treatment of components decreases over time. For this reason, it is customary to check the alkalinity of the cleaning baths at certain times and supplement the solution with new active substances as needed, or completely replace it. Such a method for replenishing the alkalinity is described in EP 1051672. The same applies similarly to the serial alkaline steeling of metallic components for the iron(III) ions and complexing agents which are depleted or dragged out from the bath.

Maintenance of cleaning, activation, and conversion baths in industrial processes for serial surface treatment of metallic components is therefore indispensable for ensuring consistent functionality and quality. However, in the serial surface treatment of metallic components comprising a wet chemical alkaline pretreatment and a subsequent conversion treatment, it has been shown that solely replenishing the content of active components of the individual baths is usually not sufficient for maintaining the long-term functionality and quality of the overall process. Thus, in this type of serial surface treatment of metallic components, it is frequently found that worsening of the filiform corrosion on the surfaces of aluminum occurs after the facility has operated for a certain period of time, which can only be insufficiently counteracted by the metered addition of active components.

The problem of the present invention, therefore, is to stabilize, with regard to the quality of the corrosion protection on the aluminum surfaces, the methods for serial wet chemical surface treatment of metallic components comprising surfaces of aluminum, in which methods an alkaline pretreatment and subsequently a conversion treatment of the components takes place in a first step, wherein the alkaline pretreatment with regard to its alkalinity must be suitable for forming a basis for conventional cleaner baths and activation baths of metallic components composed of zinc and/or aluminum.

This problem is solved by a method for the wet chemical serial surface treatment of metallic components, in which metallic components having surfaces of aluminum as well as components having surfaces of zinc are subjected to wet chemical pretreatment by bringing them into contact with an alkaline bath solution which is stored in a system tank, and a wet-on-wet conversion treatment of at least the surfaces of aluminum of the metallic components subsequently takes place, the pH of the alkaline bath solution in the wet chemical pretreatment being greater than 10, and the free alkalinity being at least 0.5 points but less than 50 points, wherein the following maximum value $Zn_{max}$ for the concentration of dissolved zinc in the alkaline bath solution of the system tank is not exceeded:

$$Zn_{max} = 0.0004 \times (pH-9) \times [FA] + 0.6 \times [Y]$$

pH: pH value
$Zn_{max}$: maximum value of the concentration of dissolved zinc, in mmol/L
[FA]: free alkalinity in mmol/L
[Y]: concentration in mmol/L of complexing agents Y in the form of water-soluble condensed phosphates calculated as $P_2O_6$, and/or in the form of water-soluble organic compounds which contain at least one functional group selected from $-COOX_{1/n}$, $-OPO_3X_{2/n}$, and/or $-PO_3X_{2/n}$, where X represents either a hydrogen atom or an alkali and/or alkaline earth metal atom having the respective valence n.

Compounds are water-soluble within the meaning of the present invention when their solubility in deionized water having a conductivity of not greater than von 1 $\mu Scm^{-1}$ at a temperature of 20° C. is at least 1 g/L.

The free alkalinity of the alkaline bath solution in the wet chemical pretreatment of the method according to the invention is determined by titration of 10 mL of the bath solution with 0.1 N sodium hydroxide solution to a pH of 8.5. The pH is determined potentiometrically using a calibrated glass electrode. The volume in milliliters of the titrant added then corresponds to the point number of the free alkalinity of the bath solution. This point number multiplied by 10 in turn corresponds to the free alkalinity in millimoles per liter.

According to the invention, serial surface treatment is the bringing of a plurality of metallic components into contact with the alkaline bath solution, stored in the system tank, for the wet chemical pretreatment, without a complete replacement with make-up quantities of the alkaline bath solution of the system tank taking place after each pretreatment of an individual metallic component.

In this regard, methods according to the invention for serial surface treatment are preferred in which the wet chemical serial surface treatment of the metallic components takes place at least for such a number of metallic components that a total surface area comprising solely zinc surfaces of the metallic components, in square meters, which is greater than the following term:

$$\frac{V_B \times Zn_{max} \times M_{Zn}}{\Delta m_{Zn}}$$

$V_B$: bath volume in $m^3$
$Zn_{max}$: maximum concentration of dissolved zinc in mmol/L
$M_{Zn}$: molar mass of zinc in g/mol
$\Delta M_{Zn}$: surface-normalized pickling removal, based on the zinc surfaces of the metallic components in $g/m^2$,
is subjected to wet chemical pretreatment with the alkaline bath solution of the system tank This number barely corresponds to the theoretically required number of metallic components which during the serial pretreatment is capable of causing the maximum concentration $Zn_{max}$ of dissolved zinc in the alkaline bath solution to exceed by the pickling removal from the zinc surfaces of the components.

Thus, if the bath volume of the system tank containing the alkaline bath solution is completely replaced, thus interrupting the series before the total surface area of zinc surfaces calculated according to the above-mentioned equation has been treated, the maximum concentration $Zn_{max}$ of dissolved zinc in the alkaline bath solution cannot be exceeded solely by pickling processes. Of course, this applies only if zinc which is already dissolved is not contained in the alkaline bath solution at the beginning of the series.

According to the invention, a system tank is understood to mean a container which stores a bath solution for bringing into contact with the metallic components. For bringing into contact with the bath solution, the metallic component may be immersed and passed through such a system tank, or at least one portion of the bath solution for bringing into contact with the metallic component is temporarily fed out of the system tank, and after bringing into contact, for example after spray application, is at least partially fed back into the system tank.

According to the invention, the successive wet chemical process steps of pretreatment and conversion treatment are carried out by the wet-on-wet method. This means that between the pretreatment and the conversion treatment, no drying step takes place in which, with the aid of technical measures such as increasing the temperature or setting a directed air stream, drying of the wet film on the components is to be effected. In such a drying step, reoxidation of the metal surfaces generally occurs which partially eliminates the activation of the metal surfaces achieved by the alkaline bath solution. However, drying of wet films which adhere to the metallic components from the pretreatment or from a subsequent rinsing step during transport of the metallic components to the conversion treatment step, for example due to a temporary facility standstill, is not detrimental to the method according to the invention.

In the method according to the invention, comprising a pretreatment with alkaline bath solution and a subsequent conversion treatment, it is ensured that the formation of a high-quality corrosion-protective layer is maintained during the serial surface treatment, within which components having zinc surfaces and components having aluminum surfaces as well as components having a composite design comprising zinc and aluminum surfaces are treated. This applies in particular for maintaining the quality of the corrosion-protective coating on the surfaces of the component which are surfaces of aluminum. It has surprisingly been shown that for this purpose, in particular the concentration of dissolved zinc in alkaline bath solutions of the type of the present invention is crucial, and therefore becomes a control variable to be controlled in the surface treatment according to the invention. Thus, when a maximum concentration $Zn_{max}$ of dissolved zinc is exceeded, there is insufficient activation of the aluminum surfaces of the components in the pretreatment, which has an adverse effect on the conversion layer formation.

The method according to the invention is preferably carried out in such a way that the maximum value $Zn_{max}$ of dissolved zinc in the alkaline bath solution does not exceed the following value:

$$Zn_{max} = 0.0004 \times (pH-9) \times [FA] + 0.5 \times [Y]$$

pH: pH value
$Zn_{max}$: maximum value of the concentration of dissolved zinc in mmol/L
[FA]: free alkalinity in mmol/L
[Y]: total concentration in mmol/L of complexing agents Y in the form of water-soluble condensed phosphates calculated as $P_2O_6$, and/or in the form of water-soluble organic compounds which contain at least one functional group selected from —$COOX_{1/n}$, —$OPO_3X_{2/n}$, and/or —$PO_3X_{2/n}$, where X represents either a hydrogen atom or an alkali and/or alkaline earth metal atom having the respective valence n.

In methods according to the invention, the maximum value $Zn_{max}$ of dissolved zinc is dependent on the alkalinity of the wet chemical pretreatment, and to a great extent on the concentration of specific complexing agents Y. In the presence of these complexing agents Y, the tolerance with regard to dissolved zinc increases proportionally to their concentration. The presence of complexing agents Y is therefore preferred in alkaline bath solutions of the pretreatment in methods according to the invention. The complexing agents Y are particularly preferably contained in a total concentration of at least 0.5 mmol/L, in particular preferably in a total concentration of at least 5 mmol/L, but for economic reasons, preferably not more than in a total concentration of 100 mmol/L, particularly preferably not more than 80 mmol/L.

Suitable complexing agents Y in the form of organic compounds in the alkaline bath solution of the wet chemical pretreatment of the method according to the invention are preferably selected from α-, β-, and/or γ-hydroxycarboxylic acids containing no more than 10 carbon atoms, 1-hydroxyethane-1,1-diphosphonic acid, [(2-hydroxyethyl)(phosphonomethyl)amino]methylphosphonic acid, diethylenetriamine pentakis(methylenephosphonic acid), and/or aminotris(methylenephosphonic acid).

It has been shown that in particular organic complexing agents Y which are selected from water-soluble organic compounds containing at least one functional group selected from —$OPO_3X_{2/n}$ and/or —$PO_3X_{2/n}$, where X represents either a hydrogen atom or an alkali and/or alkaline earth metal atom having the respective valence n, provide for a stable maximum concentration $Zn_{max}$ as the upper limit for dissolved zinc. These organic complexing agents are therefore preferred in methods according to the invention. In this regard, it is further preferred that the organic complexing agents Y are selected from water-soluble organic compounds which contain at least two such functional groups selected from —$OPO_3X_{2/n}$ and/or —$PO_3X_{2/n}$, and preferably additionally contain an amino, hydroxyl, or carboxyl group, for example 1-hydroxyethane-1,1-diphosphonic acid, [(2-hydroxyethyl)(phosphonomethyl)amino]methylphosphonic acid, diethylenetriamine pentakis(methylenephosphonic acid), and/or amino-tris(methylenephosphonic acid) in the α- or β-position for an —$OPO_3X_{2/n}$ and/or —$PO_3X_{2/n}$ functionality.

Overall, it is preferred that the organic complexing agents Y are not polymeric compounds, so that their molar mass is preferably less than 500 g/mol.

Pyrophosphates, triphosphates, and/or polyphosphates are preferred as complexing agents Y, which represent water-soluble condensed phosphates, in the alkaline bath solution of the wet chemical pretreatment of the method according to the invention; within the scope of the present invention, their concentration in mol/L is always to be calculated based on the theoretical structural unit $P_2O_6$. Accordingly, 1 mol of a triphosphate anion corresponds to 1.5 mol $P_2O_6$ and therefore to 1.5 mol of complexing agent Y.

The active components which are customary in the prior art are used for adjusting the alkalinity in the bath solution of the wet chemical pretreatment. Such active components are substances that are alkaline reacting, and are preferably selected from alkali metal hydroxides, alkali metal carbonates, alkali metal phosphates, and organic amines, in particular alkanolamines.

It is frequently necessary for the alkaline bath solution in the wet chemical pretreatment of the method according to the invention to additionally contain surface-active substances which free the metal surfaces of the metallic components from organic impurities in order to allow a uniform pickling attack on the particular metal surfaces. In one preferred embodiment of the method according to the invention, 0.01-10 g/L of nonionic surfactants are therefore additionally contained in the alkaline bath solution. Ethoxylates, propoxylates, and/or ethoxylates/propoxylates of alcohols or alkylamines containing 6 to 16 C atoms in the alkyl radical, which may also be closed terminal groups, are then preferably contained as nonionic surfactants.

To ensure sufficient activation of the aluminum surfaces of the metallic components subjected to serial surface treatment by a method according to the invention, it is preferred when the total content of water-soluble silicates and borates in the alkaline bath solution in the wet chemical pretreatment is less than 100 mg/L, particularly preferably less than 50 mg/L, in particular preferably less than 10 mg/L.

If metallic components made of galvanized strip steel or metallic components having a composite design, which have galvanized steel surfaces in addition to aluminum surfaces, are to be subjected to wet chemical serial surface treatment in the method according to the invention, for optimal edge corrosion protection it is preferred that the wet chemical pretreatment takes place using an alkaline bath solution which brings about steeling of the zinc surfaces according to DE 102010001686, and for this purpose additionally contains at least 50 mg/L, particularly preferably at least 100 mg/L, of dissolved iron, preferably in the form of iron(III) ions. In this regard, a particularly preferred method according to the invention contains the following in the alkaline bath solution of the wet chemical pretreatment:

a) 0.05-2 g/L of iron(III) ions,
b) 0.1-4 g/L of phosphate ions,
c) at least 0.1 g/L of complexing agents Y selected from organic compounds c1) which contain at least one functional group selected from —$COOX_{1/n}$, —$OPO_3X_{2/n}$, and/or —$PO_3X_{2/n}$, where X represents either a hydrogen atom or an alkali and/or alkaline earth metal atom having the respective valence n, and/or selected from condensed phosphates c2) calculated as $PO_4$,
d) a total of 0.01-10 g/L of nonionic surfactants,
e) a total of less than 10 mg/L of ionic compounds of the metals nickel, cobalt, manganese, molybdenum, chromium, and/or cerium, in particular less than 1 mg/L of ionic compounds of the metals nickel and/or cobalt, wherein no more than 10 g/L of condensed phosphates calculated as $PO_4$ are contained, and the molar ratio of the sum of components c1) and c2) to iron(III) ions is greater than 1:1.

If steeling of the zinc surfaces takes place prior to the conversion treatment of the metallic components, a method according to the invention in which dissolved zinc is continuously or discontinuously removed from the alkaline bath solution, which is then a solution for steeling, is particularly worthwhile, since in this type of alkaline bath solution a comparatively high rate of pickling removal from the zinc surfaces results. This necessarily results in the portion of dissolved zinc in the system tank for the pretreatment exceeding the critical maximum value particularly quickly during serial surface treatment, if no technical measures for removing dissolved zinc are initiated.

Significant pickling removal from the zinc surfaces of the components results, regardless of the exact composition of the alkaline bath solution of the wet chemical pretreatment. As a result of this pickling removal during the serial surface treatment according to the invention, a high steady-state portion of dissolved zinc is present or builds up in the system tank of the wet chemical pretreatment.

A method procedure according to the invention therefore usually requires technical measures for removing or reducing the portion of dissolved zinc in the bath solution of the system tank in order to ensure long-term optimal corrosion protection after conversion treatment has taken place. Therefore, in one preferred method according to the invention, an exceedance of the maximum value $Zn_{max}$ of the portion of dissolved zinc in the wet chemical pretreatment is prevented by continuously or discontinuously removing dissolved zinc from the alkaline bath solution of the system tank, wherein this does not take place solely by discarding at least a portion of the alkaline bath solution of the system tank containing dissolved zinc, and adding another portion of an alkaline solution, which contains only the active components of the alkaline bath solution, to the system tank.

In this context, active components are understood to mean exclusively components which are essential to adjusting the alkalinity of the bath solution, or which bring about significant occupation of the surface of the treated components with foreign elements or chemical compounds and are thus depleted. Significant occupation of the surface is present, for example, when the content of foreign elements on the metal surfaces or the content of chemical compounds on average is greater than 10 mg/m². This is the case, for example, when, as in the alkaline steeling according to DE 102010001686, a surface occupation greater than 10 mg/m², based on the foreign element iron, results after wet chemical pretreatment has taken place, so that iron(III) ions represent an active component in such an alkaline pretreatment. The same may similarly apply to corrosion inhibitors which have a high affinity for the metal surfaces to be treated and which may thus bring about corresponding surface occupation.

Therefore, the removal of dissolved zinc from the alkaline bath solution for meeting the maximum value $Zn_{max}$ according to the invention preferably does not take place solely by compensating for drag-out or evaporation losses in the system tank by adding aqueous solutions which merely substitute the active components of the alkaline bath solution of the system tank and the bath volume. Such a method for reducing the portions of dissolved zinc on the one hand would be extremely uneconomical, and on the other hand would not be suitable for effective control of the portion of dissolved zinc in the pretreatment, since either the reduction of the zinc portion to below the maximum value $Zn_{max}$ or the replenishment of the active components to the exact amount needed would have to be prioritized in a procedural manner.

Therefore, in one method according to the invention, the removal of dissolved zinc from the alkaline bath solution of the wet chemical pretreatment preferably takes place by adding a water-soluble compound, which represents a source of sulfide ions, to at least a portion of the alkaline bath solution of the system tank, and separating a precipitate, which forms in this portion of the alkaline bath solution, from the alkaline bath solution, optionally by filtration or other separation methods.

Such a preferred method offers the advantage that dissolved zinc is selectively converted to undissolved zinc sulfide in the alkaline bath solution of the wet chemical pretreatment. Thus, active components are neither removed from the bath solution nor is the bath solution discarded, since the reaction product zinc sulfide is present as a solid in a form which now is not detrimental to sufficient activation of the aluminum surfaces in the pretreatment. The reaction product zinc sulfide may therefore either be left in the alkaline bath solution, or optionally, as a precipitation product, separated from the bath solution by filtration in order to avoid sediment formation.

In one preferred embodiment of the method according to the invention, in which method dissolved zinc is continuously or discontinuously removed from the alkaline bath solution by the metered addition of a compound which releases sulfide ions, the portion of the alkaline bath solution of the system tank, to which the water-soluble compound, which represents a source of sulfide ions, is added, is brought to a temperature of at least 40° C., but preferably to a temperature of less than 65° C. This ensures that in this portion of the alkaline bath solution, a voluminous precipitate of zinc sulfide forms which may be separated from the bath solution containing the active components, using simple filtration methods, for example by means of conventional filter pressing.

In one particularly preferred method according to the invention, dissolved zinc is continuously removed from the alkaline bath solution of the wet chemical pretreatment by continuously withdrawing partial volumes of the alkaline bath solution from the system tank, to which partial volumes the water-soluble compound, which represents a source of sulfide ions, is added, after which the solid portion which is formed in these partial volumes of the alkaline bath solution is preferably separated from the alkaline bath solution by filtration, and the alkaline bath solution which has been freed from the solid is then recirculated into the system tank, preferably as a filtrate. If the water-soluble compound, which represents a source of sulfide ions, is added to the partial volumes of the alkaline bath solution at a temperature of at least 40° C., but preferably less than 65° C., the solid portion occurs in the form of a voluminous precipitate which may be separated by simple filtration methods. The use of ultrafiltration methods also allows the separation of the sulfidic solid portion which is present in colloidal form and as such usually forms at lower temperatures.

Such a method in which partial volumes are removed from the system tank, worked up, and subsequently recirculated back to the system tank is generally also referred to in the prior art as a bypass method.

The removal of the solid portion, which consists essentially of zinc sulfide, in the so-called bypass of the system tank may also take place by means of other conventional separating processes, for example, with the aid of a cyclone or a centrifuge.

After separation of the solid portion, which consists essentially of zinc sulfide, in the above-described preferred bypass method according to the invention, in which dissolved zinc is continuously removed from the alkaline bath solution of the system tank, an excess of water-soluble compounds, which represent a source of sulfide ions, may be removed by adding a water-soluble oxidizing agent. A prerequisite in this regard is that the water-soluble oxidizing agent has a standard reduction potential greater than +0.6 V (SHE), particularly preferably a standard reduction potential greater than +1.0 V (SHE). Peroxides, particularly preferably hydrogen peroxide, are preferably added to the partial volumes of the alkaline bath solution, to which partial volumes, in this particular method according to the invention, a compound which releases sulfide ions is added, and which partial volumes are subsequently freed from the resulting solid portion, before the partial volumes are recirculated into the system tank. Such a preferred bypass method according to the invention offers the advantage that the concentration of dissolved zinc in the partial volumes of the alkaline bath solution which are recirculated into the system tank is practically "zero" due to adding an excess of water-soluble compounds which release sulfide ions. The addition of the oxidizing agent suppresses the possible formation of odor which could develop due to the outgassing of hydrogen sulfide from excess sulfide ions.

In preferred methods according to the invention which provide for the deposition of dissolved zinc with the aid of compounds which release sulfide ions, water-soluble compounds which are selected from alkali and alkaline earth metal sulfides, ammonium sulfide, ammonium polysulfide or thioacetamide are preferred as a source of sulfide ions, and therefore, as a precipitation reagent. The use of thioacetamide has the particular advantage that this organic compound releases sulfide ions in alkaline aqueous media at a very moderate rate, and therefore the formation of odor is completely absent due to the outgassing of small quantities of hydrogen sulfide.

In a serial surface treatment, according to the invention, of metallic components, wherein components having aluminum surfaces are also treated, an increased portion of dissolved aluminum may also build up due to pickling processes in the alkaline bath solution of the wet chemical pretreatment. An increased portion of dissolved aluminum may in turn adversely affect the activation of the aluminum surfaces, so that reduced corrosion protection is observed after the conversion treatment has taken place. In methods according to the invention, less worsening of the corrosion protection properties is observed above an aluminum portion of 15 mmol/L, whereas this worsening becomes significant above 20 mmol/L.

In one preferred embodiment of the surface treatment according to the invention, the alkaline bath solution of the wet chemical pretreatment therefore contains aluminum dissolved in water, wherein, however, a maximum value of 20 mmol/L, preferably 15 mmol/L, for the concentration of dissolved aluminum in the alkaline bath solution of the system tank is not exceeded due to the fact that a water-soluble compound, which represents a source of silicate anions, is added to at least a portion of the alkaline bath solution of the system tank, and a precipitate which forms in this portion of the alkaline bath solution is optionally separated from the alkaline bath solution, preferably by filtration.

In one particularly preferred method according to the invention, the reduction of the portion of dissolved aluminum in the alkaline bath solution of the wet chemical pretreatment takes place by continuously removing partial volumes from the bath solution of the system tank, to which partial volumes the water-soluble compound, which represents a source of silicate anions, is added, after which the solid portion which is formed in these partial volumes of the alkaline bath solution is preferably separated from the alkaline bath solution by filtration, and the partial volumes of the alkaline bath solution which have been freed from the solid are then recirculated into the system tank, preferably as a filtrate.

In such a preferred bypass method, the metered addition of the water-soluble compounds, which represent a source of silicate anions, may take place independently of the metered addition of those water-soluble compounds which represent a source of sulfide ions. In this way, the portions of dissolved zinc and aluminum in the system tank may likewise be controlled independently of one another. Therefore, in one particularly preferred bypass method, appropriate quantities of these precipitation reagents are initially added to the partial volumes of the alkaline bath solution which are removed from the system tank, and the solid portion, which consists essentially of zinc sulfide and aluminum silicate, is separated from the bath solution, preferably by filtration, and the partial volumes of the alkaline bath solution which have been freed from this solid portion are then recirculated into the system tank, preferably as a filtrate.

Alkali and alkaline earth metal silicates and/or silicic acid are/is preferably used as water-soluble compounds which represent a source of silicate anions and therefore a precipitation reagent for dissolved aluminum.

The filtration in the above-mentioned preferred embodiments of the method according to the invention preferably takes place with an exclusion limit of 0.5 µm, particularly preferably with an exclusion limit of 0.1 µm.

The contents of dissolved zinc and aluminum in the alkaline bath solution of the wet chemical pretreatment are preferably analytically determined simultaneously to the process, thus during the serial surface treatment, according to the invention, of the metallic components, and directly or indirectly used as a control variable for technical measures for reducing the proportion of dissolved zinc and/or aluminum in the system tank. For this purpose, a volume flow is preferably withdrawn from the system tank and filtered, preferably with an exclusion limit of 0.1 µm, and prior to feeding the filtrate back into the system tank, a sample volume is withdrawn and the content of dissolved zinc and aluminum is preferably photometrically determined, wherein the determination value of the dissolved contents is then compared to the above-mentioned preferred maximum values of dissolved aluminum and to the maximum value $Zn_{max}$, and water-soluble compounds which release sulfide ions and/or water-soluble compounds which release silicate anions are added in a metered manner at least to a partial volume of the alkaline bath solution of the system tank of the wet chemical pretreatment, depending on the difference from the respective maximum values. The determination of the contents of dissolved zinc and aluminum preferably takes place within 5 minutes after withdrawal of the sample volume.

Each determination method for dissolved zinc and aluminum is to be calibrated with standard solutions of standard titrimetric substances.

A photometric determination of the contents of dissolved zinc and aluminum may take place in the same sample volume or in separate portions of the withdrawn sample volume.

In the method according to the invention, the wet chemical pretreatment with the alkaline bath solution for activating the aluminum surfaces is followed by a conversion treatment of at least the aluminum surfaces of the metallic components.

According to the invention, the conversion treatment represents a wet chemical electroless pretreatment, in the course of which an inorganic coating is produced on the aluminum surfaces of the metallic components, which is composed, at least partially, of elements of the treatment solution which are not just oxygen atoms. Conversion treatments are generally known in the prior art, and have been amply described, for example as phosphating, chromating, and chromium-free alternative methods, for example based on complex metal fluorides.

In one preferred method according to the invention, the conversion treatment takes place using an acidic aqueous composition. It has been shown that the method according to the invention provides consistently good results in corrosion protection of the aluminum surfaces of the metallic components subjected to serial surface treatment, even when the bringing into contact with the acidic composition in the conversion treatment lasts only for a period in which the surfaces of aluminum undergo a pickling removal of less than 0.1 g/m$^2$.

For serial surface treatments of metallic components, comprising an alkaline pretreatment and such a subsequent conversion treatment that only brings about very little pickling removal from the aluminum surfaces of less than 0.1 g/m$^2$, the method according to the invention is therefore particularly preferably to be used for good corrosion protection of the aluminum surfaces, since in the pretreatment, it already ensures excellent activation of the aluminum surfaces.

The method according to the invention is particularly advantageous when the conversion treatment which follows the wet chemical pretreatment with the alkaline bath solution takes place using an acidic aqueous composition containing water-soluble compounds of the elements Zr, Ti, and/or Si. In this regard, acidic aqueous compositions which additionally contain compounds that represent a source of fluoride ions are preferred. The water-soluble compounds of the elements Zr, Ti, and/or Si are preferably selected from hexafluoro acids of these elements as well as their salts, while compounds which represent a source of fluoride ions are preferably selected from alkali metal fluorides. The total content of water-soluble compounds of the elements Zr, Ti, and/or Si in the acidic aqueous composition of the conversion treatment of the surface treatment according to the invention is preferably at least 5 ppm, in particular preferably at least 10 ppm, but the acidic composition preferably contains no more than 1000 ppm total of these compounds, in each case based on the above-mentioned elements. The pH of the acidic aqueous composition is preferably in the range of 2-4.5.

The method according to the invention is particularly suited for the serial surface treatment of metallic components which are produced in composite design, and which have surfaces of zinc in addition to surfaces of aluminum, since for such components, a corrosion-protective coating which is largely homogeneous over the entire component may be achieved on a long-term basis for minimizing contact corrosion due to the serial surface treatment according to the invention. In particular for metallic components having composite design, whose surfaces are composed of at least 2%, preferably at least 5%, of surfaces of aluminum, and are composed at least 5%, preferably at least 10%, of surfaces of zinc, a method according to the invention for the serial surface treatment successfully comes into play, in which the portion of dissolved zinc in the alkaline bath solution of the system tank is preferably held below the maximum value $Zn_{max}$ by adding water-soluble compounds which represent a source of sulfide ions. The percentage of the surfaces of aluminum and zinc always refers to the total surface of the metallic component which is brought into contact with the alkaline bath solution of the wet chemical pretreatment.

According to the invention, metallic surfaces of alloys of zinc and aluminum are also considered surfaces of these metals, as long as the content of the co-alloyed elements is below 50 at.-%. In addition, within the meaning of the present invention, surfaces of zinc are also formed from galvanized or alloy galvanized steel elements which are combined alone or with other metallic components to form the metallic component.

EXEMPLARY EMBODIMENTS

The influence of alkaline pretreatments on the effectiveness of the conversion treatment is described below with reference to individual exemplary embodiments. In particular, the positive influence on the filiform corrosion of aluminum which is surface-treated in methods according to the invention, and which has additionally been coated with a cathodic dip coating, is explained.

The compositions of different alkaline pretreatments (systems A-E) are given in table 1. In addition to the prototype alkaline systems A-D, which vary with regard to their free alkalinity and pH, a cleaner for alkaline degreasing of metals (system E) and an alkaline steeling of the type described in DE 102010001686 were listed. Table 1 also lists the maximum value $Zn_{max}$ for dissolved zinc which is specific for the particular system for the alkaline pretreatment.

To explain the positive influence of such methods for surface treatment comprising alkaline pretreatment and subsequent conversion treatment, for which zinc and aluminum ions are held below the respective specific maximum value according to the present invention in the pretreatment, defined quantities of dissolved zinc and aluminum were added to systems A-E. For alkaline pretreatments which contained more dissolved zinc or aluminum than stipulated by the respective maximum value, comparative tests were conducted, after a quantity of precipitation reagent had been added to these pretreatment solutions which was sufficient to bring the zinc concentration below the maximum value. Exclusively aluminum sheets were surface-treated. The aging of the alkaline bath solution of a system tank in a serial wet chemical treatment of metallic components was simulated, as already stated, by the defined addition of water-soluble zinc salts and aluminum salts. The determination of the actual value, stated in table 2, of the concentration of dissolved zinc and aluminum took place immediately before bringing the aluminum sheets into contact with the particular alkaline system. The analytical determination method is discussed further below.

The alkaline pretreatment was always followed by an inorganic conversion treatment free of chromium, using the wet-on-wet method, with a rinsing step in between. A cathodic electro-dip coating was subsequently applied, and the filiform corrosion of aluminum sheets surface-treated in this way was assessed. The associated results are summarized in table 2.

The process for the wet chemical surface treatment of aluminum sheets (Aluminum AA 6014) consisted of the following detailed individual steps:
1. alkaline pretreatment with compositions corresponding to examples A1-3; B1-4; C1-4; D1-5; E1-2; and F1-6 (see table 2 and the respective base formulation from table 1) by immersing the sheets for 3 minutes at 60° C.;
2. rinsing with deionized water ($\kappa < 1$ μScm$^{-1}$) by immersing the sheets for 30 seconds at 25° C.;
3. inorganic conversion treatment with an acidic aqueous composition containing 0.15 g/L $H_2ZrF_6$
   40 ppm free fluoride (measured with an ion-selective combination electrode) pH 4.5
   by immersing for 2 minutes at 30° C. (pickling removal from aluminum sheet<0.05 g/m$^2$, determined by differential gravimetric analysis);
4. rinsing with deionized water ($\kappa < 1$ μScm$^{-1}$) by immersing the sheets for 30 seconds at 25° C.;
5. depositing the cathodic dip coating (Cathoguard 500, BASF) in a dry film thickness of 20±2 μm. The dip coating was burned in for 25 minutes at 180° C.

The actual concentration of dissolved zinc and aluminum in the alkaline pretreatment according to table 2 was determined by means of optical emission spectroscopy with inductively coupled argon plasma (ICP-OES).

After the sampling from the alkaline system solution, the portion of dissolved zinc may be further reduced by post-precipitation of poorly soluble hydroxides or phosphates. Therefore, for determining the actual concentration, and therefore the concentration according to the invention, of dissolved zinc and aluminum, immediately after the sample is withdrawn (within 5 minutes), it must be initially filtered over a filter having an exclusion limit of 0.1 μm and subsequently acidified. Samples prepared in this way may be analytically measured at an arbitrary later point in time, since the portion of dissolved zinc or aluminum in the acidic sample volume is invariable.

Accordingly, a sample of 2 mL of the alkaline system solution was withdrawn using a syringe, and filtrated, after placing a syringe filter, over a cellulose acetate membrane, having a porosity of 0.1 μm, integrated into the syringe filter. Enough drops of 50% by weight nitric acid were then added to the filtrate of the filter syringe, with thorough shaking, until the pH was less than 2.

After calibrating the measuring instrument (Optima 7300 DV, PerkinElmer) with standard solutions of standard titrimetric substances containing 1 ppm, 5 ppm, and 10 ppm of dissolved zinc and 4 ppm, 20 ppm, and 40 ppm of dissolved aluminum, respectively, the portion of zinc and aluminum in the acidified filtrate was determined by means of ICP-OES in the sample volume worked up in this way, which portion in turn corresponds to the actual concentration of these elements in the alkaline system solution at the time of sampling.

The pickling removal from the aluminum sheets in the alkaline pretreatment with the system solutions listed in table 2 was determined by differential gravimetric analysis. For this purpose, the aluminum sheets were initially freed of organic residues such as fats and oils, using acetone, and were weighed after being blown dry. The sheets cleaned in this way were then pretreated with the alkaline system solution corresponding to the above-described process sequence, and after the subsequent rinsing operation with deionized water likewise blown dry and re-weighed. The surface-normalized mass difference then corresponds to the pickling removal.

The filiform corrosion was evaluated after the aluminum sheets were stored for 42 days in accordance with DIN EN 3655. In each case, the average thread length and the longest thread of the occurring filiform corrosion was determined.

The results clearly show that a distinct worsening in the filiform corrosion is observed as soon as the maximum value $Zn_{max}$ for dissolved zinc is exceeded (A3; B3; C3; D4-5; E2; F3; and F5). The worsening is accompanied by a reduction in the pickling rate with respect to the aluminum substrate to be coated. As soon as a quantity of a compound which releases sulfide ions (thioacetamide, sodium sulfide) is added and the actual dissolved zinc content is thereby reduced below the maximum value $Zn_{max}$, the surface treatment according to the invention produces very good results in the filiform test (B4; C4; F6).

The actual analytically determined content of dissolved zinc resulted in the following values for these alkaline system solutions:

B4: <0.24 mg/L (<0.004 mmol/L)

C4: 1.2 mg/L (0.018 mmol/L)

F6: 484 mg/L (7.4 mmol/L).

It was thus shown that, regardless of the specific type of alkaline system solution, i.e. regardless of whether a cleaner for degreasing or an alkaline steeling is involved, controlling the maximum value of dissolved zinc in the alkaline pretreatment during the subsequent conversion treatment ensures that good corrosion protection of the aluminum surfaces of the components is achieved.

In addition, tests F2 and F3 demonstrate that excessively high contents of dissolved aluminum are likewise detrimental to the corrosion resistance of the surface-treated aluminum sheets. Here as well, the exceedance of the maximum value for dissolved aluminum in the alkaline pretreatment is accompanied by a drastic decrease in the pickling removal from the aluminum sheet (see F3). The metered addition of such a quantity of silicates to this alkaline pretreatment, which theoretically causes a reduction in the dissolved aluminum content to 500 mg/L, once again results in increased pickling removal from the aluminum sheet, and after surface treatment is completed, gives a very good result in the filiform test (cf. F3 and F4).

Thus, it is shown in general that pickling removal of at least 0.5 g/m² from the surfaces of the aluminum in the wet chemical pretreatment with the alkaline bath solution must take place in order to be able to achieve sufficiently good quality of the corrosion-protective surface treatment with a subsequent conversion treatment.

TABLE 1

Compositions of various alkaline systems for pretreatment

| System | Phosphate [g/L] | Carbonate * [g/L] | Additives | Y [mmol/L] | FA [mmol/L] | pH value ** | $Zn_{max}$ [mmol/L] |
|---|---|---|---|---|---|---|---|
| A | 4.10 | 5.4 | — | — | 77 | 11.0 | 0.062 |
| B | 3.60 | 1.3 | — | — | 34 | 11.5 | 0.034 |
| C | 3.60 | 10.8 | — | — | 155 | 11.5 | 0.155 |
| D | 4.10 | 5.4 | — | — | 49 | 12.0 | 0.059 |
| E | — | 5.0# | — | 43.9‡ | 40 | 10.5 | 26.4 |
| F | — | 15.0# | Fe(NO₃)₃ | 43.9‡ | 15 | 11.0 | 26.5 |

* as $K_2CO_3$
as $NaHCO_3$
‡ 2.2 g/L $K_4P_2O_7$; 7.1 g/L HEDP; 0.6 g/L sodium gluconate
** The pH was set using potassium hydroxide

TABLE 2

Filiform corrosion test in accordance with DIN EN 3665 on pretreated, conversion-coated aluminum sheets (Alu AA 6014) after layer build-up by cathodic dip coating (Cathoguard 500, BASF)

| System | No. | Zn [mmol/L] | Al [mmol/L] | Sulfide [1] [g/L] | Silicate [2] [g/L] | Pickling rate [3] [g/m²] | Thread length [4] [mm] |
|---|---|---|---|---|---|---|---|
| A | 1 | — | — | — | — | 0.66 | 0.3/2.0 |
|   | 2 | 0.012 | — | — | — | 0.53 | 0.4/2.3 |
|   | 3 | 0.076 | — | — | — | 0.01 | 3.5/6.5 |
| B | 1 | — | — | — | — | 0.70 | 0.2/1.9 |
|   | 2 | 0.008 | — | — | — | 0.50 | 0.4/2.2 |
|   | 3 | 0.153 | — | — | — | 0.04 | 3.2/6.0 |
|   | 4 | 0.153 | — | 0.15 * | — | 0.75 | 0.2/1.8 |
| C | 1 | — | — | — | — | 1.27 | 0.1/1.1 |
|   | 2 | 0.018 | — | — | — | 0.69 | 0.2/1.8 |
|   | 3 | 0.275 | — | — | — | 0.00 | 3.7/6.8 |
|   | 4 | 0.275 | — | 0.15 * | — | 1.25 | 0.1/1.2 |
| D | 1 | — | — | — | — | 1.54 | 0.2/1.6 |
|   | 2 | 0.032 | — | — | — | 0.71 | 0.3/1.9 |
|   | 3 | 0.041 | — | — | — | 0.58 | 0.3/2.4 |
|   | 4 | 0.105 | — | — | — | 0.19 | 2.3/4.8 |
|   | 5 | 0.550 | — | — | — | 0.01 | 3.6/6.1 |
| E | 1 | 7.644 | — | — | — | 0.90 | 0.3/1.1 |
|   | 2 | 30.576 | — | — | — | 0.00 | 3.1/7.1 |
| F | 1 | 7.644 | — | — | — | 0.83 | 0.2/1.2 |
|   | 2 | 7.644 | 18.649 | — | — | 0.60 | 0.4/1.7 |
|   | 3 | 7.644 | 37.297 | — | — | 0.20 | 2.5/5.2 |
|   | 4 | 7.644 | 37.297 | — | 4.00 # | 0.59 | 0.4/1.9 |
|   | 5 | 30.576 | — | — | — | 0.22 | 2.5/5.1 |
|   | 6 | 30.576 | — | 1.79** | — | 0.81 | 0.3/1.5 |

[1, 2] Theoretical concentration values based on the respective quantity of precipitation agent added in a metered manner.
[3] Pickling removal determined by differential gravimetric analysis immediately after pretreatment with the respective composition according to table 1.
[4] Given as the average thread length and the thread length of the longest thread.
* As thioacetamide;
** as sodium sulfide;
as sodium water glass 40/42 (29% $SiO_2$).

What is claimed is:

1. A method for serial wet chemical surface treatment of metallic components, in which method metallic components having surfaces of aluminum as well as components having surfaces of zinc are subjected to wet chemical pretreatment by bringing them into contact with an alkaline bath solution which is stored in a system tank, and a wet-on-wet conversion treatment of at least the surfaces of aluminum of the metallic components subsequently takes place, the pH of the alkaline bath solution in the wet chemical pretreatment being greater than 10, and the free alkalinity being at least 0.5 points but less than 50 points, wherein the following maximum value for the concentration of dissolved zinc in the alkaline bath solution of the system tank is not exceeded:

$$Zn_{max} = 0.0004 \times (pH-9) \times [FA] + 0.6 \times [Y]$$

pH: pH value
Zn$_{max}$: maximum value of the concentration of dissolved zinc, in mmol/L
[FA]: free alkalinity in mmol/L
[Y]: concentration in mmol/L of complexing agents Y in the form of water-soluble condensed phosphates calculated as P$_2$O$_6$ and/or in the form of water-soluble organic compounds which contain at least one functional group selected from —COOX$_{1/n}$, —OPO$_3$X$_{2/n}$, and/or —PO$_3$X$_{2/n}$, where X represents either a hydrogen atom or an alkali and/or alkaline earth metal atom having the respective valence n;
wherein the serial wet chemical surface treatment of the metallic components takes place at least for such a number of metallic components that a total surface area comprising solely zinc surfaces of the metallic components, in square meters, which is greater than the following term:

$$\frac{V_B \times Zn_{max} \times M_{Zn}}{\Delta m_{Zn}}$$

V$_B$: bath volume in m$^3$
Zn$_{max}$: maximum concentration of dissolved zinc in mmol/L
M$_{Zn}$: molar mass of zinc in g/mol
$\Delta M_{Zn}$: surface-normalized pickling removal, based on the zinc surfaces of the metallic components in g/m$^2$,
is subjected to wet chemical pretreatment with the alkaline bath solution of the system tank.

2. The method claim 1, wherein an exceedance of the maximum value Zn$_{max}$ in the wet chemical pretreatment is prevented by continuously or discontinuously removing dissolved zinc from the alkaline bath solution of the system tank, wherein this does not take place solely by discarding at least a portion of the alkaline bath solution of the system tank containing dissolved zinc, and adding another portion of an alkaline solution, which contains only the active components of the alkaline bath solution essential to adjusting alkalinity, to the system tank.

3. The method according to claim 2, wherein an exceedance of the maximum value Zn$_{max}$ in the wet chemical pretreatment is prevented by adding a water-soluble compound, which represents a source of sulfide ions, to at least a portion of the alkaline bath solution of the system tank, and optionally separating a solid portion, which forms in this portion of the alkaline bath solution, from the alkaline bath solution.

4. The method according to claim 3, wherein the portion of the alkaline bath solution of the system tank to which the water-soluble compound, which represents a source of sulfide ions, is added has a temperature of at least 40° C., but less than 65° C.

5. The method according to claim 4, wherein partial volumes are continuously withdrawn from the alkaline bath solution of the system tank, to which partial volumes of the alkaline bath solution containing the water-soluble compound, which represents a source of sulfide ions, is added, after which the solid portion, which is formed in these partial volumes of the alkaline bath solution is separated from the alkaline bath solution by filtration thereby forming a filtrate, and the filtrate is then recirculated into the alkaline bath solution of the system tank.

6. The method according to claim 5, wherein prior to being recirculated into the alkaline bath solution of the system tank, in order to reduce excess water-soluble compounds which represent a source of sulfide ions, a water-soluble oxidizing agent is added to the filtrate, the standard reduction potential of which oxidizing agent is greater than +0.6 V (SHE).

7. The method according to claim 6, wherein the alkaline bath solution of the wet chemical pretreatment contains aluminum dissolved in water, wherein a maximum value of 20 mmol/L, for the concentration of dissolved aluminum in the alkaline bath solution of the system tank is not exceeded due to the fact that a water-soluble compound which represents a source of silicate anions is added to at least a portion of the alkaline bath solution of the system tank, and a solid portion comprising aluminum silicate, which forms in this portion of the alkaline bath solution is optionally separated from the alkaline bath solution by filtration.

8. The method according to claim 7, wherein partial volumes are continuously withdrawn from the alkaline bath solution of the system tank, to which partial volumes the water-soluble compound which represents a source of silicate anions is added, after which the solid portion comprising aluminum silicate, which is formed in these partial volumes of the alkaline bath solution is separated from the alkaline bath solution by filtration, thereby forming a filtrate, and the filtrate is then recirculated into the alkaline bath solution of the system tank.

9. The method according to claim 8, wherein the conversion treatment following the wet chemical pretreatment using an acidic aqueous composition and the bringing into contact with same take place for a period of time in which the surfaces of aluminum of the metallic components undergo a pickling removal of less than 0.1 g/m$^2$.

10. The method according to claim 9, wherein the conversion treatment following the wet chemical pretreatment takes place using an acidic aqueous composition containing water-soluble compounds of Zr, Ti, and/or Si, and optionally compounds which represent a source of fluoride ions.

11. The method according to claim 10, wherein metallic components having a composite design are pretreated, the metallic components having surfaces wherein at least 2% of the metallic components' surfaces are aluminum surfaces, and at least 5% of the metallic components' surfaces are zinc surfaces.

12. A method for serial wet chemical surface treatment of metallic components, comprising:
a) contacting metallic components having surfaces of aluminum and surfaces of zinc with a wet chemical pretreatment comprising an alkaline bath solution which is stored in a system tank, said alkaline bath solution having a pH greater than 10 and free alkalinity of at least 0.5 points but less than 50 points, and
b) after step a) performing a wet-on-wet conversion treatment of at least the surfaces of aluminum of the metallic components,
wherein content of dissolved zinc in the alkaline bath solution of the system tank is held below a maximum value of dissolved zinc "Zn$_{max}$" according to Formula (I):

$$Zn_{max}=0.0004\times(pH-9)\times[FA]+0.6\times[Y] \qquad (I)$$

where:
pH: pH value;
Zn$_{max}$: maximum value of the concentration of dissolved zinc, in mmol/L;
[FA]: free alkalinity in mmol/L;
[Y]: concentration in mmol/L of complexing agents Y in the form of water-soluble condensed phosphates calculated as P$_2$O$_6$, and/or in the form of water-soluble organic compounds which contain at least one functional group selected from —COOX$_{1/n}$, —OPO$_3$X$_{2/n}$, and/or —PO$_3$X$_{2/n}$, where X represents a hydrogen atom, an alkali metal and/or an alkaline earth metal atom having a respective valence n; and further comprising a step of preventing exceedance of the maximum value Zn$_{max}$ in the wet chemical pretreatment by adding a water-soluble source of sulfide ions, to at least one portion of the alkaline bath solution of the system tank, and optionally separating a solid portion comprising zinc formed in said at least one portion of the alkaline bath solution, from the alkaline bath solution.

13. The method according to claim 12, wherein the alkaline bath solution of the wet chemical pretreatment contains aluminum dissolved in water, wherein concentration of dissolved aluminum in the alkaline bath solution of the system tank is held below a maximum value of 20 mmol/L, by adding a water-soluble source of silicate anions to at least a portion of the alkaline bath solution of the system tank, and optionally separating a solid portion comprising aluminum formed in said at least one portion of the alkaline bath solution, from the alkaline bath solution.

* * * * *